United States Patent
Ota et al.

(10) Patent No.: US 6,689,704 B2
(45) Date of Patent: Feb. 10, 2004

(54) GLASS MATERIAL AND GLASS CERAMIC PRODUCT

(75) Inventors: Takashi Ota, Kasugai (JP); Kazutoshi Tohyama, Nakatsugawa (JP); Masashi Fukuyama, Inuyama (JP); Akiyoshi Ide, Kasugai (JP)

(73) Assignees: NGK Insulators, Ltd., Nagoya (JP); NGk Opt Ceramics, Ltd., Komaki (JP)

( * ) Notice: Subject to any disclaimer, the term of this patent is extended or adjusted under 35 U.S.C. 154(b) by 0 days.

(21) Appl. No.: 09/821,791

(22) Filed: Mar. 29, 2001

(65) Prior Publication Data

US 2002/0010064 A1 Jan. 24, 2002

(30) Foreign Application Priority Data

Mar. 31, 2000 (JP) .......................... 2000-099921
Dec. 26, 2000 (JP) .......................... 2000-395793

(51) Int. Cl.⁷ .......................... C03C 10/12; C03C 3/085
(52) U.S. Cl. .......................... 501/7; 501/69
(58) Field of Search .......................... 501/4, 7, 69

(56) References Cited

U.S. PATENT DOCUMENTS 5,336,643 A * 8/1994 Goto et al. ............... 501/4
6,413,906 B1 * 7/2002 Shimatani et al. ........ 501/4
6,472,338 B1 * 10/2002 Shimatani et al. ........ 501/7

FOREIGN PATENT DOCUMENTS

| EP | 0 931 773 A | | 7/1999 |
| FR | 2 749 579 A | | 12/1997 |
| GB | 2 279 343 A | | 1/1995 |
| JP | 06329439 | * | 11/1994 |
| JP | 09188538 | * | 7/1997 |
| JP | 11-100229 | * | 4/1999 |
| JP | 11-100230 | * | 4/1999 |
| JP | 11-100231 | * | 4/1999 |

* cited by examiner

Primary Examiner—Karl Group

(57) ABSTRACT

A $SiO_2$—$Al_2O_3$—$Li_2O$ component-based glass material, which comprises, as basic components, $SiO_2$: 60–63 wt %; $Al_2O_3$: 23–25 wt %; and $Li_2O$: 4–5 wt % and, as modifying components, $ZrO_2$: 1.5–2.5 wt %; $TiO_2$: 0.5–2.5 wt %; MgO: 0.5–1.5 wt %; ZnO: 0.5–1.2 wt %; $Na_2O$: 0.5–2.0 wt %; and $K_2O$: 0.5–2.0 wt %, and further comprises any one of BaO: 0.5–1.0 wt, CaO: 1.0–2.0 wt %, and $B_2O_3$: 0.01–1.0 wt %. This can be reheat-formed in a glass state and has a low thermal expansion coefficient.

6 Claims, 2 Drawing Sheets

(a)

(b)

FORMED PRODUCT
(GLASS: THERMAL EXPANSION COEFFICIENT 50e-7[1/°C])

(c)

(d)

PRODUCT HAVING A LOW
THERMAL EXPANSION COEFFICIENT
(GLASS CERAMIC: THERMAL EXPANSION
COEFFICIENT 5e-7[1/°C])

GLASS MATERIAL AND GLASS CERAMIC PRODUCT

BACKGROUND OF THE INVENTION

1. Field of the Invention

The present invention relates to a glass ceramic material that has a deformation temperature at which reheat press-forming can be performed in a glass state and further has a thermal expansion coefficient of $-10 \times 10^{-7}$ to $20 \times 10^{-7}$ (1/° C.) on the basis of precipitation of a negative thermal expansion crystal by crystallization treatment after the forming; a glass ceramic product; and a process for producing the glass material.

2. Description of Related Art

In the optical communication technology field, at the present time, optical transmission members having a quartz fiber medium are mainly used. In various devices connected to the quartz fiber, such as a waveguide, a quartz substrate is also used. As requirements of a glass material used in optical members, such as various devices, it is important that a minute and highly precise pattern can be formed and that the glass material has a thermal expansion coefficient near the thermal expansion coefficient of the quartz material to which the glass material is to be connected, that is, $5 \times 10^{-7}$ (1/° C.). Therefore, a quartz substrate obtained by grinding quartz glass and then forming a minute and a highly precise pattern therein is used.

However, in the grinding method, which gives a high precision, much time is required for grinding since the glass material of the substrate is brittle, and adjustment is necessary to avoid occurrences where a grinding edge is hit on the end of the substrate and damaged. Thus, the grinding method has problems, in that it takes much time to carry out this method and also in that the costs are high. A pattern-forming method based on reheat press-forming is effective, in which patterns having very high precision can be formed together at a low cost. However, conventional glass materials have a deformation temperature, Td, at which reheat press-forming can be performed in a glass state, but their thermal expansion coefficient α after the forming is greatly different from that of $SiO_2$, that is, $5 \times 10^{-7}$ (1/° C.). Conversely, even if materials have a thermal expansion coefficient a after the forming near to that of $SiO_2$, that is, $5 \times 10^{-7}$ (1/° C.), the materials do not have a deformation temperature, Td, at which reheat press-forming can be performed in a glass state. Specifically, BK-7, as a substrate material, has a thermal expansion coefficient α of $89 \times 10^{-7}$ (1/° C.) and a deformation temperature Td of 630° C.; thus, BK-7 is capable of being subjected to reheat press-forming. However, BK-7 has a thermal expansion coefficient that is largely different from that of quartz fibers. Substrates made of quartz ($SiO_2$) and Miraclon PH-3, made by NGK Insulators, Ltd., have thermal expansion coefficients a of $5 \times 10^{-7}$ (1/° C.) and $-4 \times 10^{-7}$ (1/° C.) and deformation temperatures Td of 1700° C. and 770° C., respectively. These have a thermal expansion coefficient that is not very different from that of quartz fibers, but are not easily subjected to reheat press-forming.

SUMMARY OF THE INVENTION

Thus, an object of the present invention is to provide a glass material having a low deformation temperature when it is press-formed, and having a thermal expansion coefficient equivalent to that of quartz materials when it is finished into a product. Such optical members include members assembled into a given shape, using an ultraviolet ray hardening type resin adhesive. It is also desired that the glass material itself of such optical members has such a nature that it can transmit ultraviolet rays.

According to a first aspect of the present invention, a $SiO_2$—$Al_2O_3$—$Li_2O$ component-based glass material is provided, and comprises, as its basic components, $SiO_2$: 60–63 wt % (the symbol "wt %" means % by weight); $Al_2O_3$: 23–25 wt %; and $Li_2O$: 4–5 wt %. Further, modifying components are also provided, including $ZrO_2$: 1.5–2.5 wt %; $TiO_2$: 0.5–2.5 wt %; MgO: 0.5–1.5 wt %; ZnO: 0.5–1.2 wt %; $Na_2O$: 0.5–2.0 wt %; and $K_2O$: 0.5–2.0 wt %. The glass material further comprises BaO: 0.5–1.0 wt %. Since this glass material can have a deformation temperature of 750° C. or lower, it becomes easy to produce a glass product by reheat press-forming.

According to a second aspect of the present invention, a $SiO_2$—$Al_2O_3$—$Li_2O$ component-based glass material is provided, which comprises, as its basic components, $SiO_2$: 60–63 wt %; $Al_2O_3$: 23–25 wt %; and $Li_2O$: 4–5 wt %. Modifying components of the glass material include $ZrO_2$: 1.5–2.5 wt %; $TiO_2$: 0.5–2.5 wt %; MgO: 0.5–1.5 wt %; ZnO: 0.5–1.2 wt %; $Na_2O$: 0.5–2.0 wt %; and $K_2O$: 0.5–2.0 wt %. The glass material further comprises CaO: 1.0–2.0 wt %.

According to a third aspect of the present invention, a $SiO_2$—$Al_2O_3$—$Li_2O$ component-based glass material is provided, which comprises, as its basic components, $SiO_2$: 60–63 wt %; $Al_2O_3$: 23–25 wt %; and $Li_2O$: 4–5 wt % and, as its modifying components, $ZrO_2$: 1.5–2.5 wt %; $TiO_2$: 0.5–2.5 wt %; MgO: 0.5–1.5 wt %; ZnO: 0.5–1.2 wt %; $Na_2O$: 0.5–2.0 wt %; and $K_2O$: 0.5–2.0 wt %. The glass material further comprises $B_2O_3$: 0.01–1.0 wt %. These glass materials also make it easy to produce a glass product by reheat press-forming.

Preferably, the glass materials according to the first, second and third aspects of the present invention do not include $P_2O_5$. If the glass materials comprise $P_2O_5$, crystallization is excessively promoted, and controlling of the crystallization is difficult. For example, the thermal expansion coefficients may not be within the desired range.

According to a fourth aspect of the present invention, a glass ceramic material is provided comprising the glass material according to any one of the above 1st–3rd aspects, and having a thermal expansion coefficient in a range of $-10 \times 10^{-7}$ to $20 \times 10^{-7}$ (1/° C.). Thus, this glass ceramic material has a thermal expansion coefficient that is substantially the same as that of a quartz fiber or the like that is connected as an optical member. Therefore, the state of the connection is stable. As a result, the glass ceramic material is not exfoliated, communication is not interrupted and signals are not deteriorated.

According to a fifth aspect of the present invention, a glass ceramic material is provided, comprising the glass material according to any one of the 1st–3rd aspects, and having a crystallization ratio in a range of 30 to 50%. Since this glass ceramic material has a crystallization ratio within the range of 30 to 50%, this is a preferred material from the viewpoint of thermal expansion coefficient and shape precision. In other words, if the crystallization ratio is below 30%, the glass ceramic material having the desired thermal expansion coefficient cannot be obtained. If this ratio is over 50%, it is difficult to control the shape precision in the formed pattern, that is, the distribution of crystal phases, the size of the respective crystal phases, and so on. Thus, the shape precision is adversely affected.

According to a sixth aspect of the present invention, a glass material is provided, comprising the glass material according to one of the 1st or 3rd aspects, having a thermal expansion coefficient in a range of $-10\times10^{-7}$ to $20\times10^{-7}$ (1/° C.), and having ultraviolet ray transmissivity. Since this low thermal-expansion glass ceramic material can transmit ultraviolet rays, this material can be fixed on an optical member using an ultraviolet ray hardening type adhesive, for example, between a supporting substrate and a lid substrate.

According to a seventh aspect of the present invention, a glass ceramic material is provided, comprising the glass material according to any one of the 1st–3rd aspects, having a crystallization ratio in a range of 30 to 50%, and having ultraviolet ray transmissivity. This is suitable for reheat press-forming from the viewpoints of thermal expansion coefficient and shape precision, and can be finished into a product that can be fixed on an optical member using an ultraviolet ray hardening type adhesive.

According to an eighth aspect of the present invention, a glass product made of the glass material according to any one of the 1st–6th aspects is provided. This can be suitably used in, for example, a fiber array, a waveguide substrate, an optical lens, a reflector for a lamp, a light source for a lamp, or the like. The method for forming the glass material to obtain a glass product having a desired shape is preferably a reheat press method, but may be a grinding method.

According to a ninth aspect of the present invention, a process for producing a $SiO_2$—$Al_2O_3$—$Li_2O$ component-based glass material is provided, comprising the steps of providing a glass material obtained by blending $SiO_2$: 60–63 wt %; CaO: 1.0–2.0 wt %; $Al_2O_3$: 23–25 wt %; and $Li_2O$: 4–5 wt %, as basic components, and $ZrO_2$: 1.5–2.5 wt %; $TiO_2$: 0.5–2.5 wt %; MgO: 0.5–1.5 wt %; ZnO: 0.5–1.2 wt %; $Na_2O$: 0.5–2.0 wt %; and $K_2O$: 0.5–2.0 wt %, as modifying components, with any one of BaO: 0.5–1.0 wt %, CaO: 1.0–2.0 wt %, and $B_2O_3$: 0.01–1.0 wt %; melting the blend and quenching the melted blend; press-forming the blend into a desired shape; and subjecting the product obtained in the above-mentioned step to a crystallization treatment to precipitate a negative thermal expansion crystal having a thermal expansion coefficient in a range of $-10\times10^{-7}$ to $20\times10^{-7}$ (1/° C.) According to this process, it is possible to provide a glass material having a low deformation temperature when it is press-formed, and having a thermal expansion coefficient equivalent to that of quartz materials when it is finished into a product, as described above. It is allowable to perform reheat press-forming as a primary step, and then perform the crystallization treatment, as a secondary step, after the forming, or to perform the crystallization treatment step and subsequently perform the forming step based on reheat press-forming.

DETAILED DESCRIPTION OF THE INVENTION

Referring to the attached drawings, the present invention will be specifically described hereinafter.

The glass ceramic of the present invention has the following composition.

A $SiO_2$—$Al_2O_3$—$Li_2O$ component-based glass material comprises, as basic components, $SiO_2$: 60–63 wt %; $Al_2O_3$: 23–25 wt %; and $Li_2O$: 4–5 wt % and comprises, as nucleus generating agents, $ZrO_2$: 1.5–2.5 wt %; and $TiO_2$: 0.5–2.5 wt %. Preferably, the nucleus generating agents are $ZrO_2$: 2.3 wt %; and $TiO_2$: 2.2 wt %. Furthermore, the glass material comprises:

MgO: 0.5–1.5 wt %;

ZnO: 0.5–1.2 wt %;

$Na_2O$: 0.5–2.0 wt %;

$K_2O$: 0.5–2.0 wt %; and any one of the following:
BaO: 0.5–1.0 wt;
CaO: 1.0–2.0 wt %; and
$B_2O_3$: 0.01–1.0 wt %.

The above-mentioned glass material is melted at 1500° C. or higher and is then quenched so as to yield a parent glass material having a deformation temperature of $SiO_2$750° C. or lower.

Figure 1:
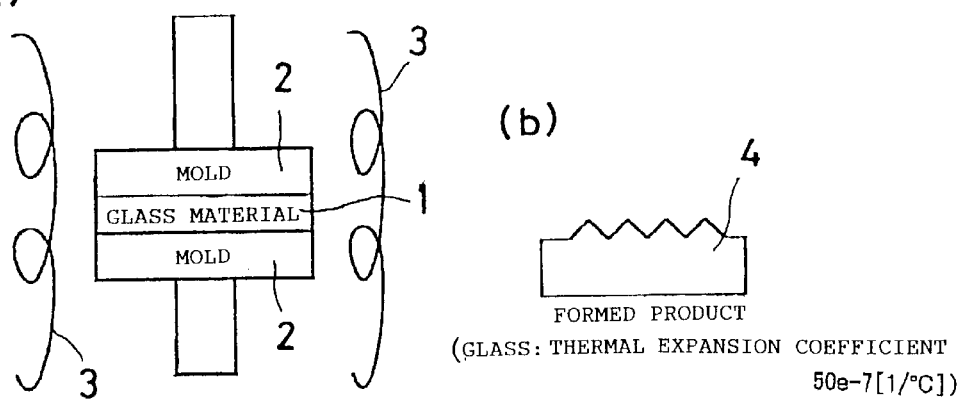
FIGS. 1(a)–1(d) are schematic views showing the reheat press process and crystallization steps according to the present invention.
Figure 1:
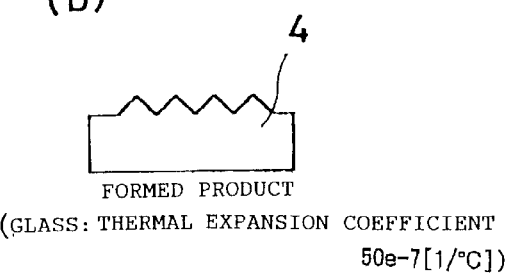
Figure 1:
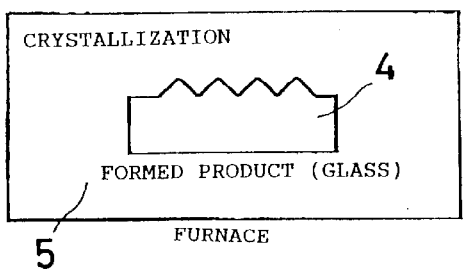
Figure 1:
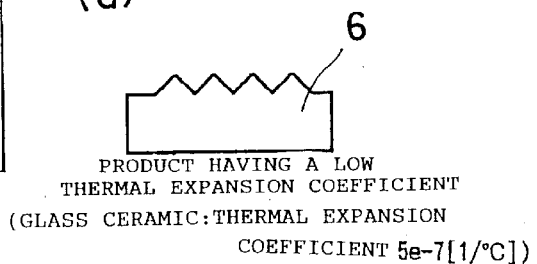

As shown in FIG. 1(a), the parent glass material 1 is subjected to reheat press-forming with desired molds 2 at 800° C., up to which the molds are heated with heaters 3, so as to obtain a molded product 4, as shown in FIG. 1(b). The thermal expansion coefficient of the molded product 4 is $5\times10^{-7}$ (1/° C.).

Figure 2:
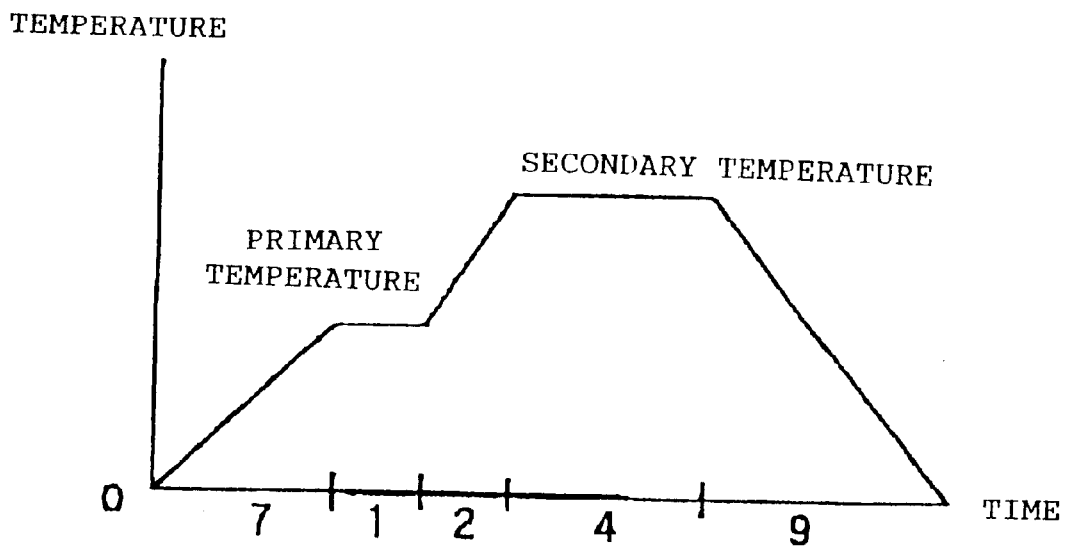
FIG. 2 is a schematic graph showing the relationship between temperature and time during heat treatment.

Next, this molded product 4 is put into a heating furnace 5 shown in FIG. 1(c), and is then crystallized under the following basic conditions by thermal treatment shown in FIG. 2, so that a glass ceramic product 6 having a thermal expansion coefficient of $5\times10^{-7}$ (1/° C.) can be obtained, as shown in FIG. 1(d).

Basic thermal treatment conditions temperature rising speed: 100° C./hour, primary temperature: 700–750° C., primary temperature holding hour: 1 hour, secondary temperature: 800–950° C., and secondary temperature holding hour: 2–4 hours Nuclei made of $TiO_2$ and $ZrO_2$ are formed homogenously by holding the present material at a temperature near its deforming temperature, Td. Furthermore, a fine crystal of β-Eucryptite is homogeneously precipitated by holding the present material at 800–950° C. for 2–4 hours. In this case, the ratio of the crystal to glass is in a range of about 30% to about 50%. The average particle size of the precipitated crystal is in a range of 0.1 μm to 0.7 μm.

A thermal expansion coefficient of 5 to $10\times10^{-7}$ (1/° C.) can be obtained if the secondary temperature is as follows: 800–850° C. in the case that the parent material comprises BaO; 900–950° C. in the case that the parent material comprises CaO; and 850–950° C. in the case that the parent material comprises $B_2O_3$. It has also been found out that if the secondary temperature ranges are limited as follows, resultant products have an ultraviolet ray transmissivity: 800–850° C. in the case that the parent material comprises BaO; and 840–850° C. in the case that the parent material comprises $B_2O_3$. In the case that the parent material comprises CaO, resultant products have no ultraviolet ray transmissivity.

Hitherto, there have not been known glass materials that have such a low thermal expansion coefficient and further can transmit ultraviolet rays. Moreover, the glass material of the present invention has a deformation temperature of 750° C. or lower and is capable of being subjected to reheat press-forming. Therefore, a V-groove can be made easily and more precisely by the reheat press-forming than by any grinding method, in particular about an optical fiber array. Additionally, in the case that the glass product of the present invention can transmit ultraviolet rays, an ultraviolet ray hardening type adhesive can be used, for example, between a supporting substrate and a lid substrate in order to assemble an optical member.

EXAMPLES

Glass materials according to the present invention having the above-mentioned compositions and produced by the above-mentioned production process were examined.

TABLE 1

| No. | SiO$_2$ | Al$_2$O$_3$ | Li$_2$O | MgO | P$_2$O$_5$ | ZrO$_2$ | ZrO | Sb$_2$O$_3$ | K$_2$O | Na$_2$O | TiO$_2$ | BaO | CaO | B$_2$O$_3$ |
|---|---|---|---|---|---|---|---|---|---|---|---|---|---|---|
| ① | 62.7 | 23.5 | 4.4 | 1.5 | | 2.3 | 1.2 | 1.4 | 2.0 | 0.5 | 1.9 | 0.5 | | |
| ② | 60.9 | 24.1 | 4.8 | 0.5 | 1.7 | 2.1 | 0.5 | 1.4 | 0.5 | 0.5 | 2.0 | | 1.0 | |
| ③ | 60.9 | 24.1 | 4.8 | 0.5 | 1.7 | 2.1 | 0.5 | 1.4 | 0.5 | 0.5 | 2.0 | | | 1.0 |

The present materials were SiO$_2$—Al$_2$O$_3$—Li$_2$O component-based glass materials and comprised, as basic components, SiO$_2$: 60–63 wt %; Al$_2$O$_3$: 23–25 wt %; and Li$_2$O: 4–5 wt % and comprised, as modifying components, ZrO$_2$: 1.5–2.5 wt %; TiO$_2$: 0.5–2.5 wt %; MgO: 0.5–1.5 wt %; ZnO: 0.5–1.2 wt %; Na$_2$O: 0.5–2.0 wt %; and K$_2$O: 0.5–2.0 wt % in common. The glass material ① further comprised 0.5 wt % of BaO, and the glass material ② further comprised 1.0 wt % of CaO. The glass material ③ further comprised 1.0 wt % of B$_2$O$_3$.

TABLE 2

| | Parent glass | | | Glass ceramic | | |
|---|---|---|---|---|---|---|
| No. | Thermal expansion coefficient α (×10$^{-7}$[1/° C.]) | Td[° C.] | Tg[° C.] | Crystallization condition (secondary temperature) [° C.] | Thermal expansion coefficient α (×10$^{-7}$[1/° C.]) | Light transmissivity % (360 nm) |
| ① | 49.2 | 742.9 | 676.8 | 800 | 10 | 25.6 |
| | | | | 850 | 7.2 | 22.1 |
| ② | 47.9 | 737.5 | 684.0 | 950 | 10 | 0 |
| ③ | 51.4 | 747.9 | 675.8 | 850 | 8.6 | 3.2 |
| | | | | 900 | 7.9 | 0 |

About the respective glass materials, their parent glass materials had a deformation temperature Td of 750° C. or lower. Therefore, in these glass materials, a V-groove can easily be formed by reheat press-forming. In addition, with respect to the relationship between the crystallization condition and the thermal expansion coefficients, the thermal expansion coefficient α was adjusted to a value equivalent to that of SiO$_2$ by adding each of three components BaO, CaO and B$_2$O$_3$ and adjusting the secondary temperature for crystallization.

In this manner, it is possible to provide a glass ceramic material having a deformation temperature at which reheat press-forming can be performed and further having a thermal expansion coefficient of $-10 \times 10^{-7}$ to $20 \times 10^{-7}$ (1/° C.), which is equivalent to that of quartz, on the basis of precipitation of a negative thermal expansion crystal-by crystallization after forming. Moreover, glass materials having a superior light transmissivity at 360 nm can be used to produce a glass product that can be fixed onto an optical member using an ultraviolet ray hardening type adhesive.

As described above, according to the present invention, a member for which the difference in the thermal expansion between this member and another glass member adhered thereto is as small as possible can be formed by reheat press-forming. The low thermal-expansion glass ceramic material that can transmit ultraviolet rays makes it possible to form, in an optical fiber array wherein optical fibers are arrayed and fixed between a supporting substrate and a lid substrate, a V-groove(in which the optical fibers should be arrayed) in any one of the two substrates by reheat press-forming.

Additionally, the glass material of the present invention can be formed into a complicated shaped by reheat press-forming, and has a superior light transmissivity. In particular, the present glass material has a low thermal expansion coefficient. For these reasons, if the present glass material is used, for example, in a non-spherical lens of an optical instrument which may undergo high temperature and low temperature, it is not feared that undesired shift of its optical axis is caused. For the same reasons, the glass material of present invention can be used suitably for a case for fiber-melted coupler.

What is claimed is:

1. A SiO$_2$—Al$_2$O$_3$—Li$_2$O component-based glass material consisting essenially of, as basic components, SiO$_2$: 60–63 wt %; Al$_2$O$_3$: 23–25 wt %; and Li$_2$O: 4–5 wt % and, as modifying components, ZrO$_2$: 1.5–2.5 wt %; TiO$_2$: 0.5–2.5 wt %; MgO: 0.5–1.5 wt %; ZnO: 0.5–1.2 wt %; Na$_2$O: 0.5–2.0 wt % P$_2$O$_5$: 0 wt %; and K$_2$O: 0.5–2.0 wt %, and further includes BaO: 0.5–1.0 wt %.

2. A glass ceramic material comprising said glass material according to claim 1, and having a thenzal expansion coefficient in a range of $-10 \times 10^{-7}$ to $20 \times 10^{-7}$ (1/° C.).

3. A glass ceramic material comprising said glass material according to claim 1, and having a crystallization ratio of 30 to 50%.

4. A glass ceramic material comprising said glass material according to claim 1, wherein said glass ceramic material has a thermal expansion coefficient in a range of $-10 \times 10^{-7}$ to $20 \times 10^{-7}$ (1/° C.) and ultraviolet ray transmissivity.

5. A glass ceramic material comprising said glass material according to claim 1, wherein said glass ceramic material has a crystallization ratio of 30 to 50% and ultraviolet ray transmissivity.

6. A glass product made of said glass material according to claim 1.

* * * * *

UNITED STATES PATENT AND TRADEMARK OFFICE
CERTIFICATE OF CORRECTION

PATENT NO. : 6,689,704 B2
DATED : February 10, 2004
INVENTOR(S) : Takashi Ota et al.

It is certified that error appears in the above-identified patent and that said Letters Patent is hereby corrected as shown below:

Title page,
Item [73], Assignee, change "NGk Opt" to -- NGK OPT --

Column 6,
Line 52, change "thenzal" to -- thermal --

Signed and Sealed this

Twenty-seventh Day of April, 2004

JON W. DUDAS
*Acting Director of the United States Patent and Trademark Office*